Dec. 11, 1934.  W. H. REICHARD  1,984,318

THRUST INDICATING DEVICE

Filed Aug. 20, 1930

INVENTOR
W. H. Reichard,
BY Neil W. Preston,
his ATTORNEY

Patented Dec. 11, 1934

1,984,318

UNITED STATES PATENT OFFICE 1,984,318

THRUST INDICATING DEVICE

Wade H. Reichard, Rochester, N. Y., assignor to General Railway Signal Company, Rochester, N. Y.

Application August 20, 1930, Serial No. 476,519

6 Claims. (Cl. 265—47)

This invention relates to devices for indicating or measuring the thrust or operating force required to move track switches on railroads.

For various reasons, it is desirable to be able to indicate quantitatively or measure the thrust or driving force required to move the switch points of track switches, movable point frogs, and the like, in their different positions. For example, such determination of the thrust required to move the switch points shows the friction, tightness of the joints, spring of the rails, and like operating conditions of the switch, and facilitates maintenance and adjustment of the track, fixing the proper switch adjustments, and the like.

These switch points may be connected to a hand-throw device or switch stand, or to the manually movable lever of an interlocking machine by a pipe or wire connection, or may be connected to a power-operated switch and lock movement, commonly known as a switch machine. Also, in measuring the thrust required to operate the switch points, it is desirable that the operating connections to the switch be undisturbed, so that after the measurements have been taken, accompanied by such adjustments as may be required, the operating condition of the switch is not altered by the detachment of the measuring device.

With these and other considerations in mind, it is proposed in accordance with this invention to provide a thrust or pressure indicator which can be inserted in place of the usual jaw pin commonly employed at some point in the operating connection to the switch points, so that by inserting this thrust indicator in place of said pin, the driving force required to move the switch points in their various positions may be accurately measured and the desired adjustments made, and upon the removal of this thrust indicator, the operating conditions of the switch are not changed.

Various characteristic features, functions, and advantages of the thrust indicator of this invention will be in part apparent, and in part pointed out, as the description progresses.

In the accompanying drawing, Fig. 1 shows diagrammatically one typical and conventional layout for a single switch operated by an electric switch machine, this being illustrative of one application of the invention;

Figure 1:
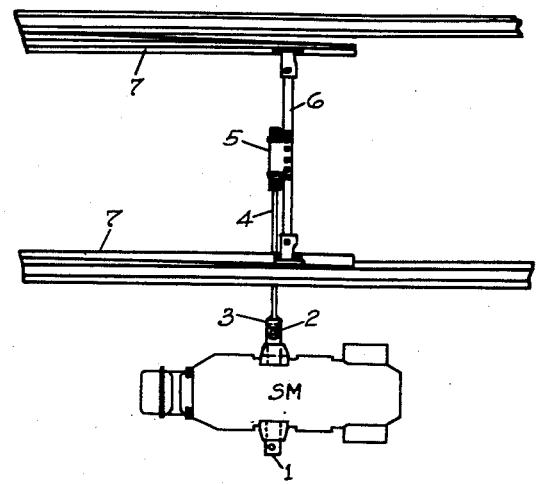

The thrust indicator of this invention is designed to be inserted in place of the usual jaw pin, which is commonly employed at some point in the operating connection to the switch points; and the power-operating switch layout of Fig. 1 illustrates only one of the many kinds of layouts of single switches, cross-overs, double-slip switches, movable point frogs, and the like, with which the thrust indicator of this invention may be used.

Referring to Fig. 1, the switch machine SM, which is assumed to be of an electrical-operated type, such as disclosed, for example, in the patent to W. K. Howe, No. 1,466,903, dated September 4, 1923, but which may be of any suitable type, is provided with a throw bar 1, having the usual hole at one end to receive the jaw pin 2 which connects this throw bar 1 to the jaw 3 at the end of the operating switch rod 4. The switch operating rod 4 is connected through the adjustable fitting 5 to the switch rod 6 secured to the switch points 7 in the usual way.

The thrust indicator of this invention comprises a member A, in the form of a cylindrical rod or pin, which can be substituted for the jaw pin 2, and which is capable of being deformed by the pressure or driving force transmitted from the throw rod 1 to the switch operating rod 4, such deformation or deflection being approximately proportional to the thrust and being quantitatively indicated.

In the specific form shown, this member A, conveniently termed a deflection member, is formed with two spaced transverse openings 8 near the ends which are interconnected by a longitudinal and transverse slot 9, thereby forming two parallel side portions 10. The dimensions and material of this deflection member A are so selected and proportioned that these side portions 10 may be bent or deflected toward each other slightly by the forces or pressures ordinarily encountered in the operation of the switch points for track switches. Such bending or deflection of these side portions 10 is well below the elastic limit of the material used for this member A, so that the side portions 10 spring back toward their normal relative positions as the thrust is changed or removed. It will be evident that the relative movement of these side members 10 toward each other is a measure of the thrust required to operate the switch points.

In one specific embodiment of the invention, the member A is made of a good grade steel and has a diameter of $7/8''$. In this embodiment the slot 9 is $1/4''$ in width and about 5'' long. The member A is of course preferably of the same diameter as is the jaw pin which it replaces but if it is of somewhat smaller diameter the device still operates satisfactorily.

Figure 2:
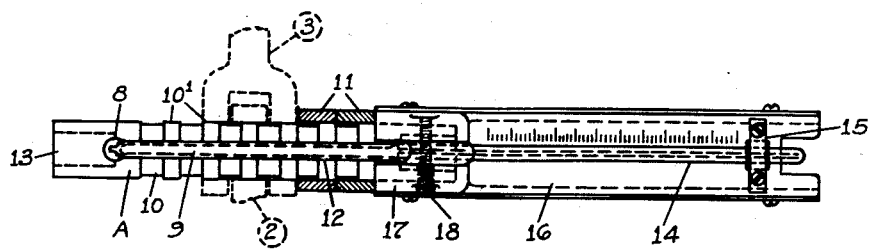
Figs. 2 and 3 show front and side views of the thrust indicator of the invention, certain parts being shown in section.

The outside surface of the deflection member A is preferably formed with raised circumferential ridges $10^1$, spaced in accordance with the dimensions of the usual jaw 3, so that the sides of this jaw engage two of these ridges 10¹, and the throw rod 2, or equivalent operating connection, engages the intermediate ridge 10¹, as indicated by dotted lines in Fig. 2. Detachable spacer rings 11 are also preferably provided so that the jaw 3 and throw rod 2 may be positioned on the member A to act at different points in its length, thereby causing the thrust required to operate the switch points to act on the side members 10 at different points between their ends. It will be evident that the same deflection of the side members 10 is produced by a smaller force or pressure acting upon these side members midway between their ends, than if this thrust acts nearer the ends of the side members. By the use of these spacer rings 11, the same thrust indicator may be used for measuring the thrust through a wide range.

Figure 4:
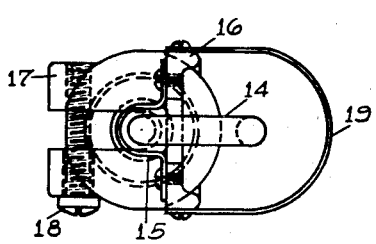
Fig. 4 is an end view.
Figure 5:
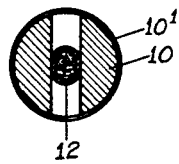
Fig. 5 is a transverse section on the line 5—5 of Fig. 3.

To indicate or measure the deflection of the side members 10, a flexible tubular sack 12, of rubber or similar material, is interposed between these side members, as shown in Fig. 5, the member A having a longitudinal bore (indicated at 13) to permit insertion and removal of this sack 12. This sack 12 is closed at one end, and has a tight joint connection at the upper end to a glass tube 14, supported by clamps 15 to a scale plate 16, which is integral with or fastened to a head 17 clamped to the end of the member A by a screw 18. The glass tube 14 is preferably bent back, as shown in Fig. 4, and protected by a sheet metal guard 19 fastened by screws to the edges of the scale plate 16. The sack 12 and the glass tube 14 is partially filled with a suitable fluid, preferably mercury.

Figure 3:
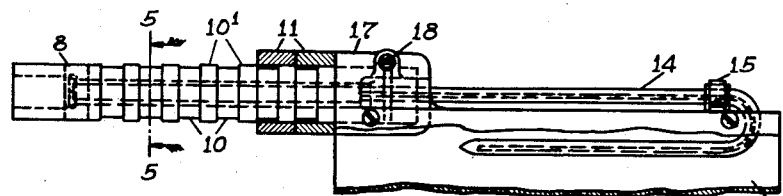

In using the thrust indicator of this invention, the usual jaw pin, located at some point in the operating connections to the switch points, such as the jaw pin 2 shown in Fig. 1, is taken out and the deflection member A of the thrust indicator inserted in its place, the desired number of spacer rings 11 being used as required. In this position, the glass tube 14 and the column of mercury therein are disposed vertically. A driving force to shift the switch points is then applied. In the case of a power-operated switch machine SM, such as shown in Fig. 1, the switch machine is cranked by hand. The thrust or driving force required to move the switch points causes deflection of the side members 10 and deformation of the sack 12, so that the mercury in this sack is displaced and the column of mercury in the tube 14 rises in accordance with this thrust, compressing the air or other gas in the tube. This thrust may be measured by a scale suitably calibrated; and the thrust in any desired number of different positions of the switch points may be accurately measured. The parts may be so proportioned that the change in the length of the column of mercury is substantially directly proportional to the thrust. The scale may be calibrated in any desired units. The tube 14 is bent over at the end, as shown in Fig. 3, so as to obtain a large compression volume of uniform cross-section above the indicating fluid.

One important feature of the thrust indicator of this invention is that it may be readily applied to all of the usual layouts for track switches, irrespective of how the switches are operated, and may be employed to measure the thrust and may be detached without disturbing the adjustment of the switch. No special tools, other than for removing and replacing jaw pin 2, are required to apply and use the thrust indicator, and nothing except jaw pin 2, about the switch points or their operating mechanism has to be taken apart and re-assembled.

The specific embodiment of the invention shown and described is susceptible of various modifications and adaptations, without departing from the invention.

What I claim is:—

1. A thrust indicator for track switches comprising, a deflection member adapted to fit a circular hole and take the place of the usual jaw pin, said member comprising two resilient portions, means supporting said portions in spaced relationship to adapt them to be moved relatively to each other to extents varying with the pressure applied thereto, and means in combination with the member for indicating the relative movement of said portions.

2. A thrust indicator for track switches comprising, a cylindrical deflection member having two spaced resilient side portions connected at the ends, a flexible sack disposed between said side portions so as to be deformed by relative movement of the said portions, and means causing the fluid in the sack to register deformations of the sack.

3. A thrust indicator for track switches comprising, a cylindrical deflection member having a longitudinal slot extending transversely thereof and forming two resilient side members connected at the ends, a flexible sack containing mercury disposed between said side members, and a glass tube connected to said sack.

4. A thrust indicator for track switches comprising, a deflection member adapted to fit a circular hole in coupled parts and take the place of the usual jaw pin, said member having two spaced resilient side portions and being formed with circumferential spaced raised ridges for co-operating with the coupled parts, spacer rings adapted to fit over said member, for determining the position of the deflection member in the coupled parts, and means in combination with the member for indicating the relative movement of the side portions of said member.

5. In a device of the character described, for use with a track switch and an operating connection therefor having a jaw pin, a thrust indicator comprising a deflection member adapted to take the place of the jaw pin, said deflection member comprising two resilient side members adapted to be moved relatively to each other to a degree varying with the pressure applied thereto, and deformable means for indicating the relative deflection of said side members.

6. A thrust indicator for track switches and the like, comprising, a deflection member adapted to fit into a circular hole in coupled parts and take the place of a usual jaw pin, said member having two spaced resilient side portions and being formed with circumferential spaced raised ridges for cooperation with the coupled parts, and means in combination with the said member for indicating the relative movement of the side portions of said member.

WADE H. REICHARD.